United States Patent
Webster et al.

(10) Patent No.: US 11,341,522 B2
(45) Date of Patent: *May 24, 2022

(54) BLOCKCHAIN DATA

(71) Applicant: Valassis Communications, Inc., Livonia, MI (US)

(72) Inventors: Jay Webster, Pacifica, CA (US); Alexander J. Olson, San Carlos, CA (US); Tobias Speckbacher, San Carlos, CA (US); Andreas Binnewies, San Carlos, CA (US)

(73) Assignee: Valassis Communications, Inc., Livonia, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/313,993

(22) Filed: May 6, 2021

(65) Prior Publication Data
US 2021/0272144 A1 Sep. 2, 2021

Related U.S. Application Data

(63) Continuation of application No. 15/451,158, filed on Mar. 6, 2017, now Pat. No. 11,010,778.

(51) Int. Cl.
*G06Q 30/02* (2012.01)
*H04L 9/30* (2006.01)
(Continued)

(52) U.S. Cl.
CPC ......... *G06Q 30/0207* (2013.01); *G06Q 20/02* (2013.01); *G06Q 20/0655* (2013.01);
(Continued)

(58) Field of Classification Search
CPC ...... G06Q 30/02; G06Q 20/387; G06Q 20/02; G06Q 20/0655; G06Q 20/36;
(Continued)

(56) References Cited

U.S. PATENT DOCUMENTS 6,938,157 B2 * 8/2005 Kaplan ............... H04L 63/0823
                                                         713/176
7,093,130 B1 * 8/2006 Kobayashi ............. G06F 21/64
                                                         705/67

(Continued)

OTHER PUBLICATIONS

Andreas M. Antonopoulos, "Mastering Bitcoin—Unlocking Digital Cryptocurrencies", Dec. 20, 2014, O'Reilly Media, Beijing Cambridge Farnham Koln Sebastopol Tokyo, XP055306939, ISBN: 978-1-4493-7404-4, pp. 219-220.

(Continued)

*Primary Examiner* — Thuy N Nguyen
(74) *Attorney, Agent, or Firm* — Fish & Richardson P.C.

(57) ABSTRACT

A coupon-minter is configured to perform operations including: generating a coupon comprising encrypted discount information, wherein the encrypted discount information is encrypted with a discount key; generating, for the coupon, a hashlock from a preimage; introducing the coupon to a blockchain in association with the hashlock, wherein the blockchain is configured to permit claiming of the generated coupon only upon receiving access to the preimage used to generate the hashlock. A store-manager configured to perform operations including: claiming, using the preimage, the coupon in the blockchain; encrypting the discount key with a clearing-house public key; updating the coupon with the encrypted discount key. A clearing-house-manager configured to perform operations comprising: detecting the store-manager's claiming of the coupon; decrypting the encrypted discount key with a clearing-house private key to re-generate the discount key; and decrypting the encrypted discount information with the preimage.

21 Claims, 6 Drawing Sheets

(51) Int. Cl.
  *H04L 9/08*    (2006.01)
  *G06Q 20/38*   (2012.01)
  *G06Q 20/02*   (2012.01)
  *G06Q 20/06*   (2012.01)
  *G06Q 20/36*   (2012.01)

(52) U.S. Cl.
  CPC ......... *G06Q 20/36* (2013.01); *G06Q 20/3674* (2013.01); *G06Q 20/387* (2013.01); *G06Q 20/3829* (2013.01); *H04L 9/0816* (2013.01); *H04L 9/30* (2013.01); *G06Q 2220/00* (2013.01)

(58) Field of Classification Search
  CPC ........... G06Q 20/3829; G06Q 20/3674; G06Q 2220/00; G06Q 30/0207–30/0277; H04L 9/30; H04L 9/0816
  See application file for complete search history.

(56) References Cited

U.S. PATENT DOCUMENTS

| | | | |
|---|---|---|---|
| 2002/0010627 A1* | 1/2002 | Lerat | G06Q 30/02 705/14.26 |
| 2002/0128903 A1* | 9/2002 | Kernahan | G06Q 30/02 705/14.22 |
| 2007/0150339 A1* | 6/2007 | Retter | G06Q 30/0236 705/14.26 |
| 2012/0123847 A1* | 5/2012 | Wane | G06Q 30/02 705/14.26 |
| 2013/0159192 A1* | 6/2013 | Partridge | G06Q 30/02 705/50 |
| 2014/0297382 A1* | 10/2014 | Chiussi | G06Q 30/0225 705/14.26 |
| 2014/0376009 A1* | 12/2014 | Takamoto | G06F 3/1284 358/1.6 |
| 2015/0324764 A1 | 11/2015 | Van Rooyen et al. | |
| 2016/0012424 A1 | 1/2016 | Simon et al. | |
| 2016/0034940 A1* | 2/2016 | VanNoller | G06Q 30/0225 705/14.26 |
| 2016/0098723 A1* | 4/2016 | Feeney | G06Q 20/065 705/75 |
| 2016/0203522 A1* | 7/2016 | Shiffert | H04L 67/104 705/14.58 |
| 2016/0343021 A1* | 11/2016 | Keswani | G07F 7/122 |
| 2017/0011392 A9 | 1/2017 | Lingham et al. | |

OTHER PUBLICATIONS

International Application No. PCT/US2018/021174, Notification of Transmittal of the International Search Report and the Written Opinion of the International Searching Authority, dated May 7, 2018, 14 pages.

* cited by examiner

BLOCKCHAIN DATA

CROSS-REFERENCE TO RELATED APPLICATIONS

This application is a continuation application of and claims priority to U.S. application Ser. No. 15/451,148, filed Mar. 6, 2017, incorporated herein by reference.

The present document relates to computer technology for tracking data in a blockchain.

BACKGROUND

A blockchain is a distributed datastore that maintains a continuously-growing list of ordered records called blocks. By design blockchains are inherently resistant to modification of the data—once recorded, the data in a block cannot be altered retroactively. Blockchains include an open, distributed ledger that can record transactions between two parties efficiently and in a verifiable and permanent way.

SUMMARY

In one aspect, a system includes a coupon-minter configured to perform operations including: generating a coupon comprising encrypted discount information, wherein the encrypted discount information is encrypted with a discount key; generating, for the coupon, a hashlock from a preimage; introducing the coupon to a blockchain in association with the hashlock, wherein the blockchain is configured to permit claiming of the generated coupon only upon receiving access to the preimage used to generate the hashlock. The system includes a store-manager configured to perform operations including: claiming, using the preimage, the coupon in the blockchain; encrypting the discount key with a clearing-house public key; updating the coupon with the encrypted discount key. The system further includes a clearing-house-manager configured to perform operations comprising: detecting the store-manager's claiming of the coupon; decrypting the encrypted discount key with a clearing-house private key to re-generate the discount key; and decrypting the encrypted discount information with the preimage. Similar methods and computer readable mediums containing operations may also be used.

Implementations can include any, all, or none of the following features. The coupon-minter, the store-manager, and the clearing-house-manager are each further configured to authenticate records of claims submitted to the blockchain. The coupon-minter is further configured to: receive an order to generate a plurality of coupons, each having the discount information; and generate a plurality of coupons, including the coupon, each of the plurality of coupons having the discount information and each of the plurality of coupons having a different preimage. To introduce the coupon to the blockchain in association with the hashlock, the coupon-minter is configured to introduce the coupon to the blockchain in a wallet assigned to the coupon-minter. To claim the coupon in the blockchain, the store-manager is configured to move the coupon from the wallet assigned to the coupon-minter to a wallet assigned to the store-manager. To observe the store-manager claim of the coupon, the clearing-house-manager is configured to monitor the wallet assigned to the store-manager. The system is configured to not publicly disclose the discount key or the discount information. The store-manager is further configured to transfer, to a wallet associated with the clearing-house-manager, the coupon; and to detect the store-manager's claiming of the coupon, the clearing-house-manager is configured to detect the transfer, to a wallet associated with the clearing-house-manager, the coupon.

Implementations can provide an array of advantages, including the following. By using encrypted data within blockchain-tracked coupon, discount information can be kept secret while the status of the coupon can be maintained in an open and reliable datastore. Use of a blockchain managed by many computers owned by users with an incentive to keep the blockchain operational can provide all users with reliability and security without the overhead, cost, or problems that can arise with a single administrator or point of failure. Encryption keys can be maintained in private, ensuring that unauthorized observers are not able to decrypt information about coupons that are redeemed in a publicly accessible blockchain. By use of a blockchain network, a clearing house can credit a store immediately upon redemption of a coupon, or faster than other traditional coupon redemption schemes.

DESCRIPTION OF DRAWINGS

Like reference symbols in the various drawings indicate like elements.

DETAILED DESCRIPTION

A blockchain network can be used to track coupons used when purchasing goods. These coupons may be inspected by any computer in communication with the blockchain, but the use of encrypted data within the coupons can allow for the hiding of sensitive information like such as the discount information within the coupon. For example, the blockchain network can be configured so that coupons are locked with a hashlock and the demonstration of a preimage that can be hashed into the hashlock is required for claiming the coupon. Further, the coupon's discount information can be encrypted with an encryption key, called a discount key, that is required to unencrypt the discount information. By controlling access to the preimage and the discount key, elements of the otherwise public coupon can be kept hidden from public observation.

Figure 1:
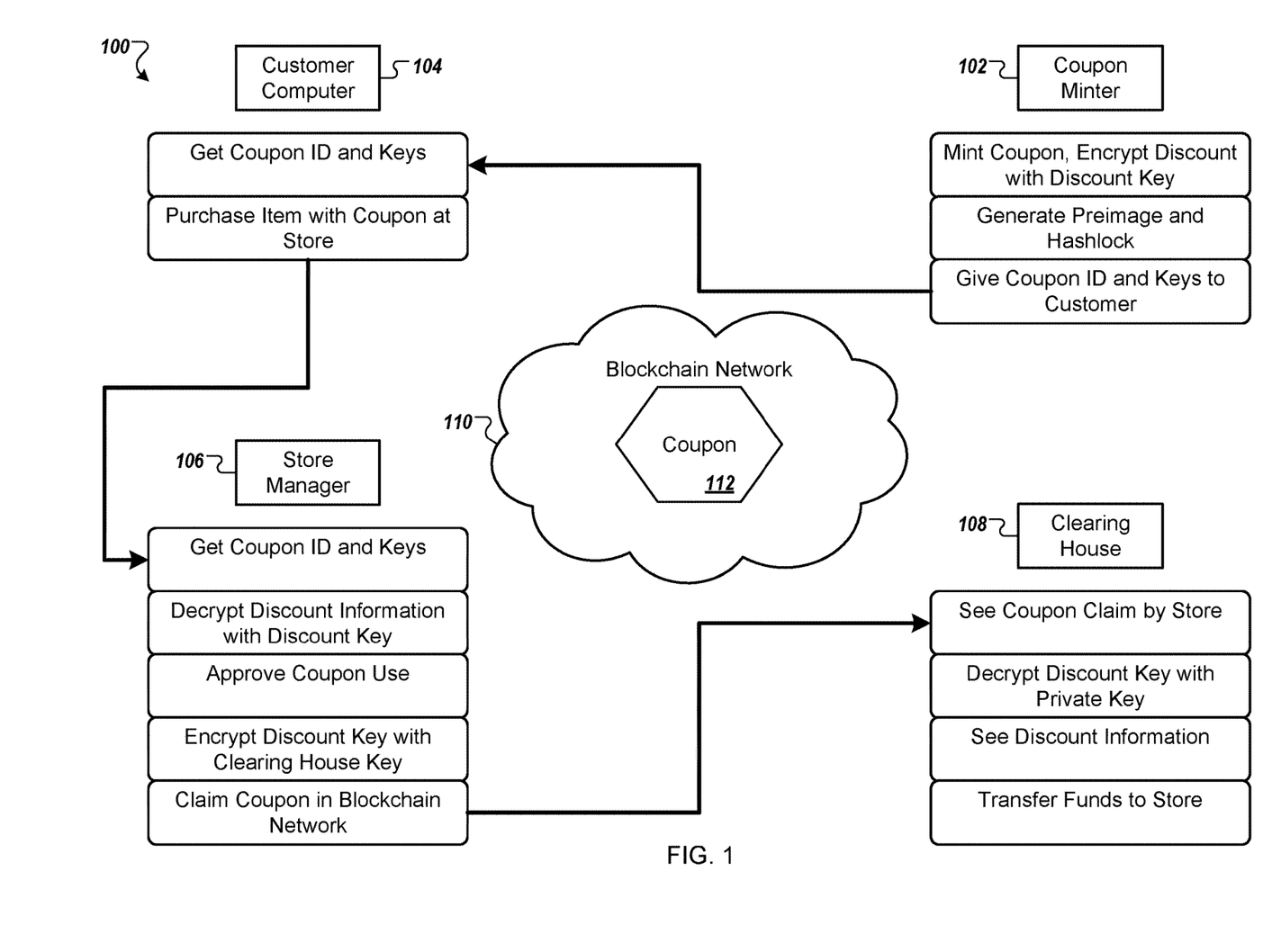
FIG. 1 is a block diagram of an example system for minting, redeeming, and crediting coupons with a blockchain.

FIG. 1 is a block diagram of an example system 100 for minting, redeeming, and crediting coupons with a blockchain. In the system 100 are a coupon-minter 102, a customer computer 104, a store-manager 106, and a clearing-house-manager 108. Some or all of these computer systems 102-108 can work together to operate a blockchain network 110 that is used to track a coupon 112 and other coupons.

The coupon-minter 102, customer computer 104, store-manager 106, and clearing-house-manager 108 are computer systems that are configured to store and process data, to communicate with each other and other computing systems, and to perform other computing tasks. They may include servers, desktop and laptop computers, mobile devices, and virtual machines. The coupon-minter 102 can be used by an organization that receives a request from, for example, manufacturers to create and distribute coupons for a particular product or product line. The coupon-minter 102 can create these coupons and distribute one such coupon 112 to a customer 104 in the blockchain network 110.

The customer computer 104 may include a home computer or mobile phone owned or operated by a consumer that will use the coupon 112. Once the customer has the coupon 112 (or information about it), the customer may use the customer computer 104 when making a transaction at a store that sells a product that is discounted by the coupon 112. When the customer makes this purchase, the store-manager 106 can claim the coupon 112 and prepare the coupon 112 for credit. The clearing-house-manager 108 can detect that the store-manager 106 has claimed the coupon, and credit the store with the credit value of the coupon 112.

In order to accomplish some or all of these actions, some or all of the computer systems 102-108 can operate the blockchain network 110. The blockchain network 110 can include a ledger that records transactions that are submitted to the blockchain network 110 and approved by the computer systems that operate the blockchain. In some configurations, for a submitted transaction to be approved, it must pass some form of test or approval as determined by the constituent computing systems. In this example, coupons may be associated with a hashlock. In order for a coupon to be claimed, the claimer must provide a piece of information called a preimage. The preimage is a data object that, when hashed according to a predetermined hash function, produces the hashlock. Because hash functions are one way—in at least practice if not always in theory—the only source for the preimage is from the party that created the hashlock. This party may then distribute the preimage to another party in order to allow that other party to claim ownership of the coupon 112 in the blockchain network 110.

These features may be used to allow for a controlled distribution of the coupon 112. The coupon minter 102 can, on behalf of a manufacturer, mint many coupons with discount information specified by the manufacturer. The coupon-minter 102 can, for each of these many coupons, create associated unique preimages. From each of these many preimages, the coupon-minter 102 can create many associated hashlocks. Then, the coupon minter 102 can distribute, to customers, unique pairs of coupon IDs and preimages. For example, coupon minter 102 can distribute the coupon ID and the preimage of the coupon 112 to the customer computer 104. This distribution may be done, for example, by email, print flier, text messages, or another distribution channel.

The customer may then produce the coupon ID and preimage when making a purchase of the item discounted by the coupon 112. The store-manager may receive the coupon ID and preimage and use these two pieces of information to claim the coupon 112. As previously explained, the coupon 112 has a hashlock that prevents claiming of the coupon 112 without the preimage. By producing the preimage with the coupon ID, the store-manager 106 has effectively demonstrated that they have been authorized to claim the coupon 112.

The clearing-house-manager 108 can detect the store-manger's 106 claiming of the coupon 112 and can begin the process of crediting the store from the manufacturer that commissioned the coupon. In order to credit the store, the clearing-house 108 must be able to access the discount information for the coupon 112. However, it is often desired by manufacturers and others to keep discount information private from parties not involved in the transactions of a particular coupon. In order to keep the discount information private, a discount key may be used to encrypt the discount information.

The coupon minter 102, when minting the coupon 112, can generate a unique encryption key called a discount key. This key may be used to symmetrically encrypt the discount information for the coupon 112. That is, a single discount key may be used to both encrypt and decrypt the discount information for a given coupon. When a coupon-minter 102 creates a run of otherwise identical coupons, each of the coupon's discount information may be encrypted with a different encryption key. This can result in the same discount information across many coupons, but with each coupon holding different encrypted data. In this way, it may be made harder to guess what discount information is in a particular run of coupons, especially if a run of coupons does not begin with the same discount information in every coupon.

In some cases, additional information or personalized information may be added to the discount information. For example, a nonce may be used to salt the discount information so that otherwise identical discount information is not identical before encryption. In another example, information about the coupon, intended recipient, intended distribution channel, etc. may be added to the discount information before encryption. This may provide, for example, less uniformity of the discount information, which may increase the difficulty of analysis of attacks on the encrypted discount information that attempt to learn of the discount information without access to the discount key.

In the example shown here, the coupon-minter 102 can provide to the customer computer 104 the discount key together with the coupon ID and preimage as previously described. The customer computer 104 may optionally use the discount key to verify the discount information if desired by the user, but the system 100 can operate whether or not the user-computer 104 decrypts the discount information.

When making a purchase, the customer computer 104 can produce the discount key in addition to the coupon ID and the preimage. The store-manager 106 can use the discount key to decrypt the encrypted discount information and determine if the discount should apply to the customer's purchase. For example, the discount information may specify a product, an expiration date, contingent circumstances (e.g., only with purchase of another product). If the store-manager 106 determines that this discount information should apply, the store-manager 106 can adjust the customer's purchase accordingly. If the store-manager 106 determines that the discount information does not apply, and if the customer does not choose to alter their transaction to make it apply (e.g., purchasing the discounted product instead of a mistakenly selected competitor product), the store-manager 106 can reject the coupon and discard the discount key.

As part of claiming the coupon 112, the store-manager 106 may encrypt the discount key using a public key of the clearing-house-manger 108 and add the encrypted discount key to the coupon 112. This public key may be published publicly by the clearing-house-manger 108 or another system, and may be the public half of a public/private key pair. In public/private encryption schemes, anyone with the public key can encrypt information but only the holder of the private key can decrypt the information. Using this feature, the store-manager 106 has encrypted the decryption key in a way that only the clearing-house-manager 108 can decrypt.

Upon detection of the store-manager's 106 claiming of the coupon 112, the clearing-house-manager 108 can decrypt the encrypted discount key, and then use the decrypted discount key to decrypt the discount information. Once gaining access to the discount information, the clearing-house-manager 108 can credit the store-manager 106 with the credit value of the coupon 112 on behalf of the manufacturer. In this way, the coupon 112 may be minted, transferred, and redeemed without publicly disclosing the discount key or the discount information.

Alternatively, instead of monitoring for a store-manager 106 to claim the coupon 112, the clearing-house-manager 108 can maintain a wallet of its own and monitor that wallet for coupons. This may allow, for example, a store-manager 106 to hold a number of coupons and redeem them in batch operations. This may result in, for example, lower overhead and administrative costs, depending on the configuration of the system. Because the store-manager 106 is initiating a transfer out of their own wallet instead of a party initiating a transfer into a wallet, the blockchain network 110 may not require a preimage for a hashlock to complete this transfer.

Figure 2:
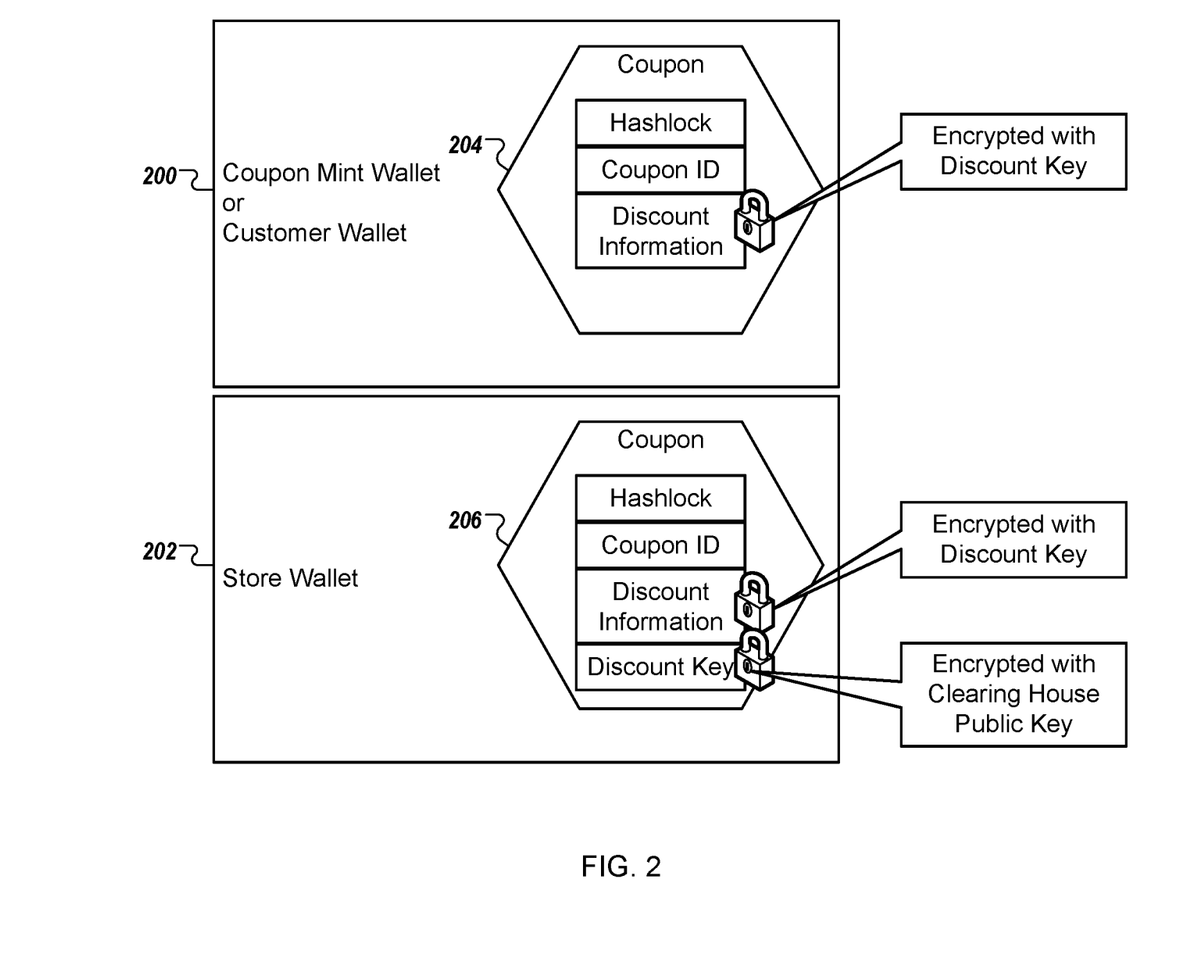
FIG. 2 is a block diagram of example wallets that store coupons in a blockchain network.

FIG. 2 is a block diagram of example wallets 200 and 202 that store coupons in a blockchain network. In this example, a coupon 204 represents a coupon as minted by a coupon-minter and before the coupon 204 has been claimed by a store-manager. A coupon 206 represents a similar coupon after it has been claimed by a store-manager.

The wallets 202 and 204 are data constructs that contain, in a blockchain network, a particular entity's digital goods. In the case of a blockchain network that tracks at least coupons, the wallets 200 and 202 can contain coupons like the coupons 204 and 206. The data to record a data object in a wallet often takes the form of an entry in a ledger that records the minting of an object in a particular wallet (identified with a wallet address), or the transfer of an existing data object from a source address to a destination address.

The coupon 204 can be created by a coupon-minter or held by a customer. The coupon 204 can include a hashlock, a coupon ID, and discount information that has been encrypted with a discount key. As previously described, the preimage and discount key may be needed to generate the hashlock and encrypted discount information, however the preimage and discount key themselves are not included in the coupon 204.

Claiming a coupon involves producing the preimage and transferring the coupon to a wallet associated with the claimer. For example, if a store-manager claims the coupon 204, it is moved to the store's wallet 202 from the source wallet 200 associated with the coupon-minter or customer. Claiming the coupon also can include modifying the coupon 204 into the coupon 206. The discount key can be encrypted with a clearing house's public key and added to the coupon 206. In some implementations, this addition may be atomic with the claiming—that is, moving the coupon to a different wallet may be performed as a single indivisible action with editing the coupon. In some implementations, claiming and modifying a coupon may be divisible operations that may be performed separately.

Figure 3:
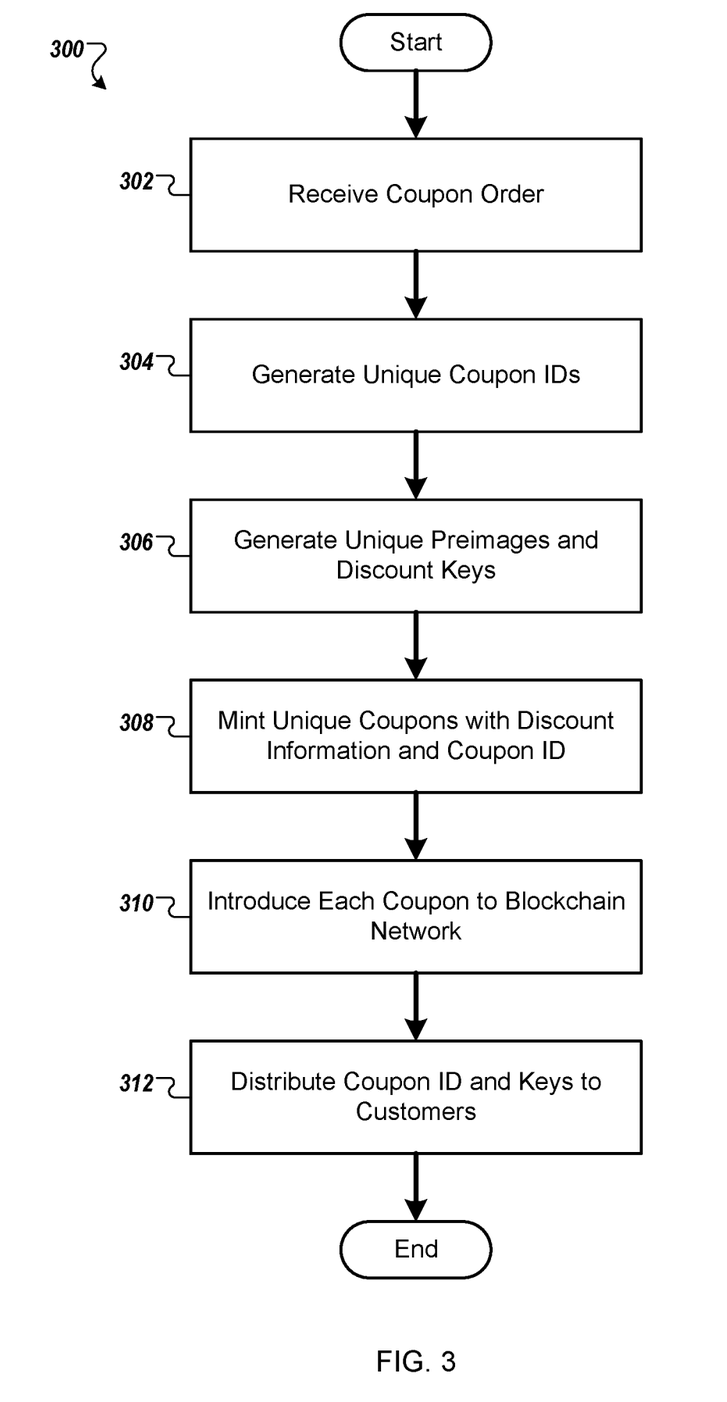
FIG. 3 is a flowchart of an example process performed by a coupon minter.

FIG. 3 is a flowchart of an example process 300 performed by a coupon minter. For example, the process 300 may be performed by the coupon-minter 102. Therefore, the following example will be described with reference to the elements of the system 100. However, another system or systems may be used to perform the process 300 or a similar process.

A coupon order is received 302. For example, a coupon service organization may operate the coupon-minter 102 and the clearing-house-manager 108 as part of offering coupon services to manufacturers and marketers. The coupon service organization may receive an order to generate a coupon campaign for a line of frozen burritos from a manufacturer and distributor of the burritos. The coupon-minter 102 can receive an order for, for example, a particular number of coupons each offering a discount of one dollar off the purchase of the burritos to be distributed to customers that have expressed an interest in receiving coupons related to frozen foods and fitting some other criteria.

Unique coupon IDs are created 304. To prepare to fill this order, the coupon-minter 102 can generate or allocate a number of unique coupon IDs needed to fulfill the order. For example, if the order was for three thousand coupons, the coupon-minter 102 can generate three thousand unique coupon IDs. Coupon IDs can be of types that allow unique and difficult to guess values. These coupon IDs may be sequential integers, non-sequential random tokens in a name-space many orders of magnitude larger than the token size (e.g., to make tracking and guessing by third parties harder), or universally unique identifiers (UUIDs). In some cases, the coupon IDs are used by the blockchain to index all coupons. In some cases, the coupon IDs may be different than an identifier used by the blockchain to index coupons and/or different data objects.

Unique preimages and discount keys are generated 306. For each unique coupon ID, the coupon-minter 102 can generate a unique preimage and a unique discount key. The coupon-minter 102 can use a true-random or pseudo-random source to generate the preimage and discount keys. The size and format of the preimage and discount keys may be dependent on the particular requirements of the security arrangement of the system 100. For example, the system 100 may specify that the keys should have a particular minimum size or conform to a particular format. This can result in the coupon-minter 102 having a list of unique coupon IDs, with each coupon ID having associated one unique preimage and one unique discount key.

Unique coupons are minted 308. For example, the coupon-minter 102 can generate discount information for the received order. This discount information can include a purchase discount that is to be applied when a customer uses the coupon, a credit value that specifies the value of a credit that should be given to a merchant that receives the coupon, an expiration date, terms and conditions, etc. Additionally, other information such as a random nonce may be included. In some cases, the order may specify a mix of different coupons (e.g., some for one dollar off, some for two dollars off; some for one flavor and some for a different flavor), but in this example the order specifies that all coupons should be the same one dollar off all flavors.

The coupon-minter 102 can then encrypt the discount information with each unique discount key, resulting in unique encrypted discount information for each unique coupon ID. Because a third party would not have access to the discount keys, the third party would not be able to determine if any two examples of encrypted discount information contain the same unencrypted discount information.

The coupon-minter 102 can also hash each preimage into an associated hashlock value by running each preimage through a one-way function. For example, the Secure Hash Algorithm 256 (SHA 256) or the Keccak 256 algorithm could be used, to name only two possibilities.

With this information available, the coupon-minter 102 can mint the coupons by, for example, combining each unique coupon ID with its associated hashlock and encrypted discount information. For example, the newly-minted coupon may take the form of a string of alpha-numeric characters resulting from the concatenation of the coupon ID, hashlock, and encrypted discount information; a structured data object in the Extensible Markup Language (xml) language; a JSON object; or printed onto piece of paper in a barcode such as a QR code.

Each new coupon is introduced 310 into a blockchain network. For example, the coupon-minter 102 may submit each coupon as a new entry in the ledger of the blockchain network 110, specifying that the coupon be added to a wallet associated with the coupon-minter 102. Computer systems that operate the blockchain network 110 may vote on the introduction, and only add the coupon to the ledger if a sufficient number (e.g., simple majority or other threshold) approve the transaction. These computer systems may check, for example, if the minter an authorized part of the blockchain network and/or if the transaction is valid (e.g., formatted appropriately, within permission scope, operating on a valid coupon ID).

Coupon IDs and keys are distributed 312 to customers. For example, the coupon-minter 102 may maintain one or more distribution channels separate from the blockchain network 110 through which coupon information may be transmitted to customers. In this example, some coupon information is added to a template to generate coupon images that can be printed; and some coupon information is sent via email. However, any appropriate distribution channel for sending information may be used. This may include, but is not limited to, print (e.g., direct mail, circulars, coupon books, free-standing inserts), email, website and other internet destinations, and mobile or desktop applications.

In another configuration, the coupon-minter 102 may place coupons directly into wallets associated with customers. For example, the customer computer 104 may register with the coupon-minter 102 to show an interest in receiving coupons. This registration may include identifying a wallet associated with the customer computer 104. When the coupon-minter 102 adds the coupon 112 to the blockchain network 110, the coupon-minter 102 may specify that the coupon 112 should be placed in the wallet of the customer computer 104.

Figure 4:
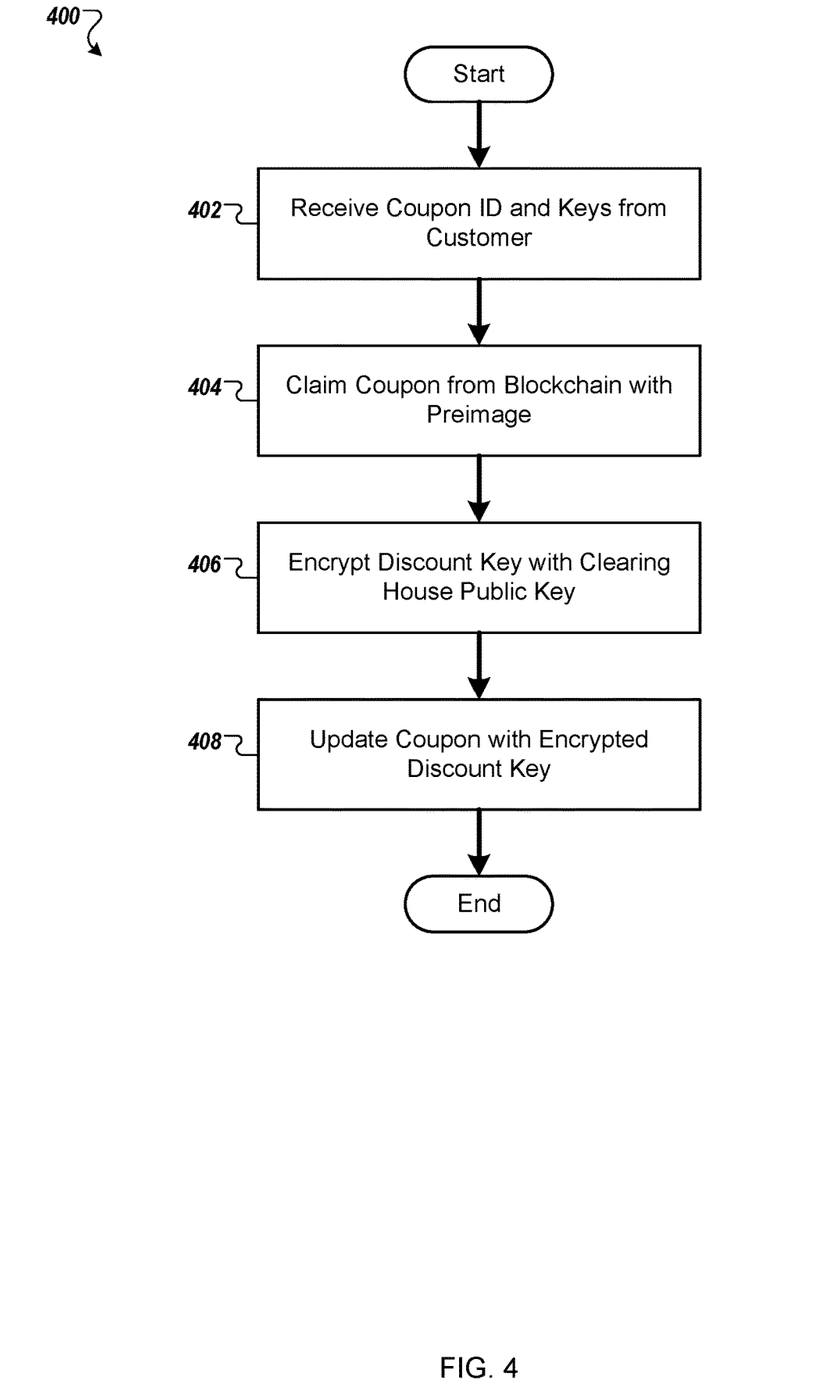
FIG. 4 is a flowchart of an example process performed by a store-manager.

FIG. 4 is a flowchart of an example process performed by a store-manager. For example, the process 400 may be performed by the store-manager 106. Therefore, the following example will be described with reference to the elements of the system 100. However, another system or systems may be used to perform the process 400 or a similar process.

A coupon ID and keys are received 402 from a customer. For example, a customer can bring their customer computer 104 with them to the grocery store. The customer can bring up an email received from the coupon-minter 102 that contains a barcode containing a coupon ID, preimage, and discount key. A clerk at the store can scan this barcode and verify that it does apply to the burritos that the customer is purchasing.

The store-manager 106 may also use the scanned discount key to decrypt the discount information. In order to do so, the store-manger 106 may read a copy of the encrypted discount information from the coupon 112 from the blockchain network 110. The store-manager 106 then decrypts the encrypted discount information and verifies that the discount information specifies a dollar off the customer's purchase of the frozen burritos.

A coupon is claimed 404 from the blockchain network with the preimage. In response to a successful redemption of the coupon by the customer, the store-manager 106 can apply the one-dollar discount to the purchase of the frozen burritos, and can claim the coupon from the blockchain network 110.

To claim the coupon 112, the store-manager 106 can submit a claim request to the blockchain network 110. The claim request can include the coupon ID and preimage as collected from the barcode. Computing systems that operate the blockchain network 100 can receive copies of this claim request and determine if it should be honored. For a claim request to be valid, the preimage of the claim request must be of a value that, when hashed, matches the hashlock. The computing system may verify the preimage by hashing it and then voting to accept or reject the claim request depending upon the result of this comparison. In this example, the store-manager 106 received a valid coupon ID and preimage from the customer, and the claim request is accepted. As a result, the coupon 112 moves from a wallet associated with the coupon-minter 102 to a wallet associated with the store-manager 106.

The discount key is encrypted 406 with a clearing house public key and the coupon is updated 408 with the encrypted discount key. For example, the store-manager 106 may encrypt the discount information and submit a modification request to the blockchain network 110 to modify the coupon 112 with the discount information encrypted with the clearing house public key.

In some implementations, the claiming 404 and updating 408 may be performed as a single, atomic function. That is, the claiming and updating may be requested, and may either succeed as a single function or fail as a single function. By constraining the claiming 404 and updating 408 to be atomic, the system may be able to avoid a state in which the claiming 404 succeeds but the updating 408 fails.

The above described interactions with the blockchain may be subject to approval voting by the computer systems that manage the blockchain. For example, this voting may require a majority of such computing systems to examine a request and vote to accept it if it appears to be a valid request.

Figure 5:
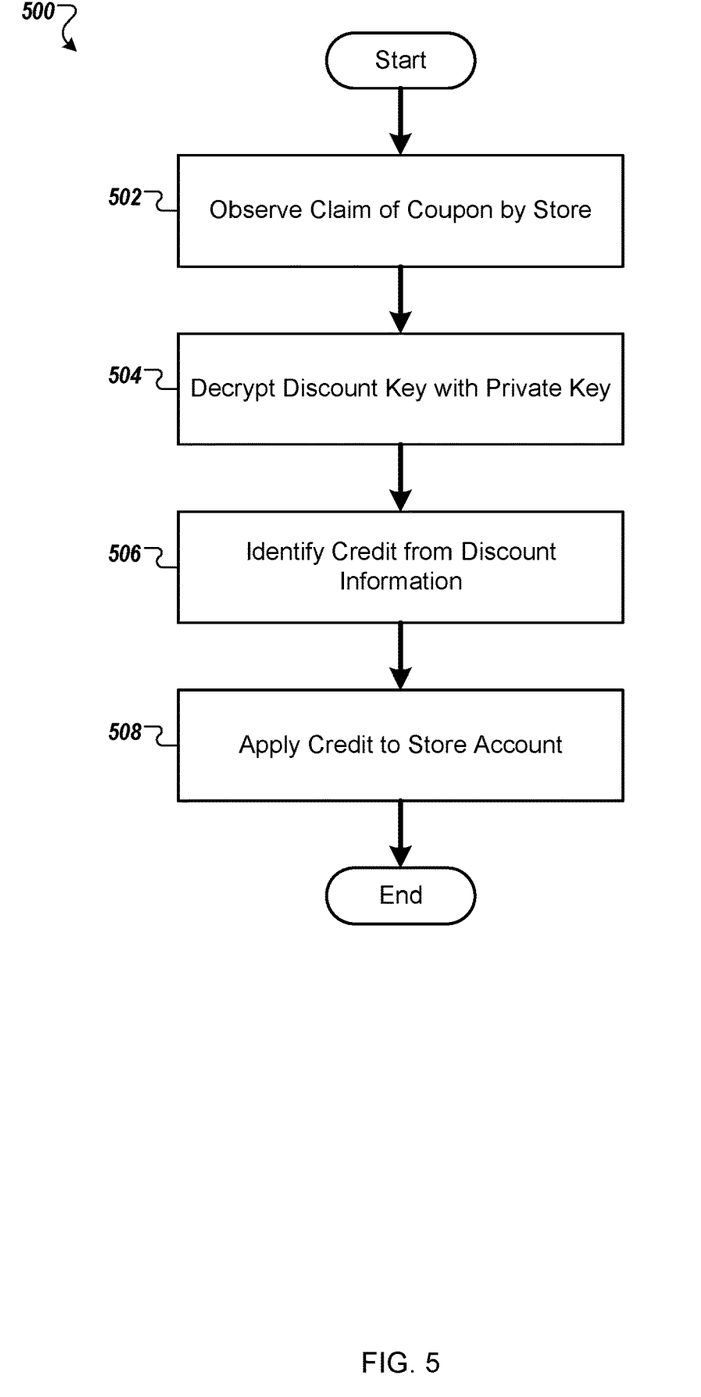
FIG. 5 is a flowchart of an example process performed by a clearing-house-manager.

FIG. 5 is a flowchart of an example process performed by a clearing-house-manager. For example, the process 500 may be performed by the clearing-house-manager 108. Therefore, the following example will be described with reference to the elements of the system 100. However, another system or systems may be used to perform the process 500 or a similar process.

Claiming of a coupon by a store-manager is observed 502. For example, the clearing-house-manager 108 can observe transactions in the blockchain network 110. When a transaction moves the coupon 112 from the coupon-minter's 102 wallet to the store-manager's 106 wallet (or from another wallet such as the customer-computer's 104 wallet, or from a wallet into the clearing-house-manager's 108 wallet), the clearing-house-manager 108 may identify this as a claim by the store-manager 106

The encrypted discount key is decrypted 504 with a private key. The clearing-house-manager may use a private key to decrypt the discount information that was encrypted by the store-manager 106 with the matching public key. By doing so, the clearing-house-manager 108 can gain access to the discount information.

A credit value is identified 506 from the discount information and credit is applied 508 to the store's account. With the store identified and a credit value from the discount information identified, the clearing-house-manager 108 can credit the credit value to the store. This may take the form of, for example, a bank transfer, a check sent to the store, or another appropriate form of payment. In some cases, credits may be aggregated to reduce transaction costs. For example, all credits for a day or week may be aggregated into one payment at the end of that time window.

Figure 6:
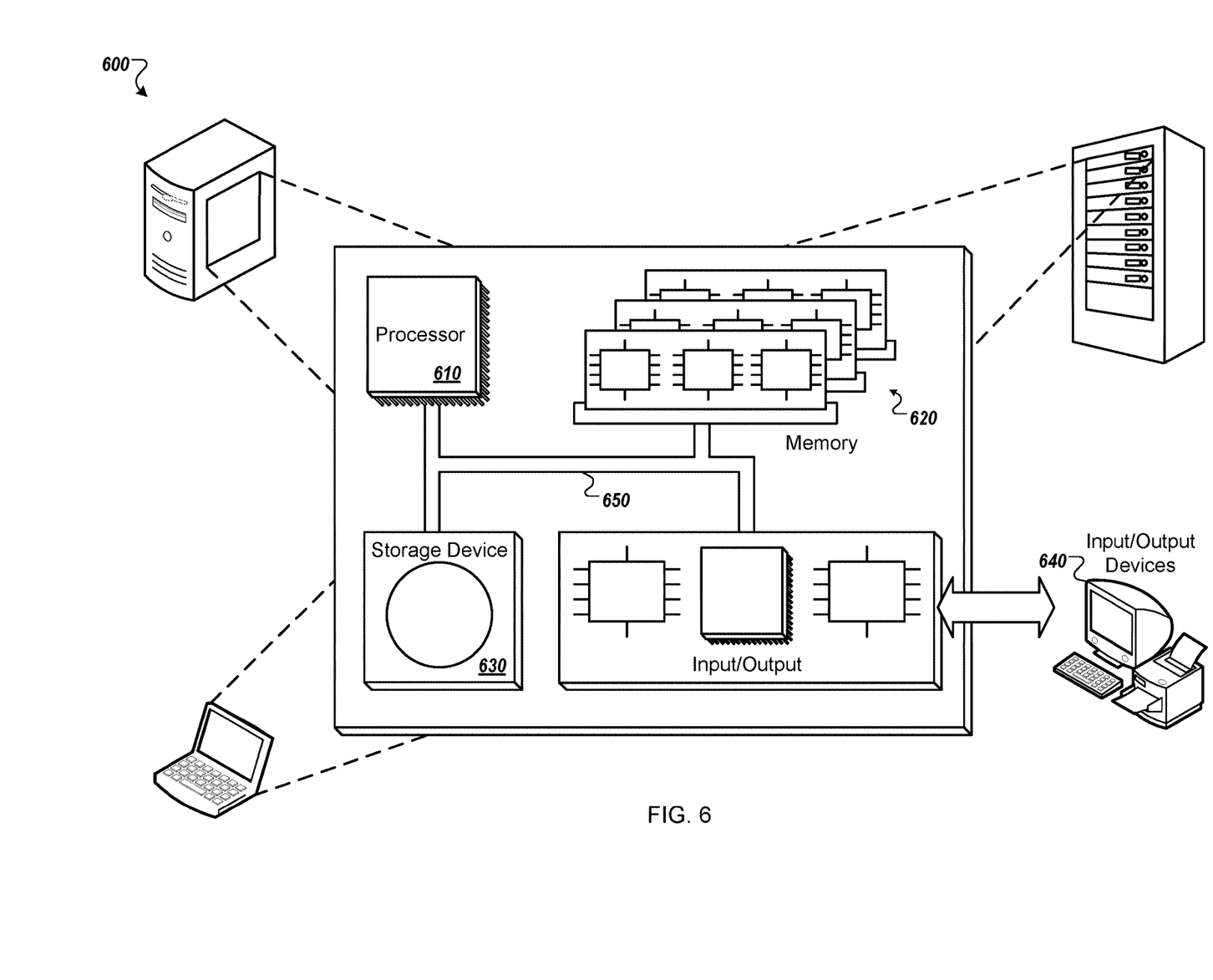
FIG. 6 is a schematic diagram that shows an example of a computing device and a mobile computing device.

FIG. 6 is a schematic diagram that shows an example of a computing system 600. The computing system 600 can be used for some or all of the operations described previously, according to some implementations. The computing system 600 includes a processor 610, a memory 620, a storage device 630, and an input/output device 640. Each of the processor 610, the memory 620, the storage device 630, and the input/output device 640 are interconnected using a system bus 650. The processor 610 is capable of processing instructions for execution within the computing system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the computing system 600. In some implementations, the memory 620 is a computer-readable medium. In some implementations, the memory 620 is a volatile memory unit. In some implementations, the memory 620 is a non-volatile memory unit.

The storage device 630 is capable of providing mass storage for the computing system 600. In some implementations, the storage device 630 is a computer-readable medium. In various different implementations, the storage device 630 may be a floppy disk device, a hard disk device, an optical disk device, or a tape device.

The input/output device 640 provides input/output operations for the computing system 600. In some implementations, the input/output device 640 includes a keyboard and/or pointing device. In some implementations, the input/output device 640 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A system comprising:
   a coupon-minter configured to perform operations including:
     generating a coupon comprising encrypted discount information, wherein the encrypted discount information is encrypted with a discount key;
     generating, for the coupon, a hashlock from a preimage;
     introducing the coupon to a blockchain in association with the hashlock, wherein the blockchain is configured to permit claiming of the generated coupon only upon receiving access to the preimage used to generate the hashlock;
   a store-manager configured to perform operations including:
     claiming, using the preimage, the coupon in the blockchain;
     encrypting the discount key with a clearing-house public key;
     updating the coupon with the encrypted discount key; and a clearing-house-manager configured to perform operations comprising:
  detecting the store-manager's claiming of the coupon;
  decrypting the encrypted discount key with a clearing-house private key to re-generate the discount key; and
  decrypting the encrypted discount information with the preimage;
wherein the store-manager is further configured to transfer, to a wallet associated with the clearing-house-manager, the coupon; and
  to detect the store-manager's claiming of the coupon, the clearing-house-manager is configured to detect the transfer, to a wallet associated with the clearing-house-manager, the coupon.

2. The system of claim 1, wherein the coupon-minter, the store-manager, and the clearing-house-manager are each further configured to authenticate records of claims submitted to the blockchain.

3. The system of claim 1, wherein:
the coupon-minter is further configured to:
  receive an order to generate a plurality of coupons, each having the discount information; and
  generate a plurality of coupons, including the coupon, each of the plurality of coupons having the discount information and each of the plurality of coupons having a different preimage.

4. The system of claim 1, wherein to introduce the coupon to the blockchain in association with the hashlock, the coupon-minter is configured to introduce the coupon to the blockchain in a wallet assigned to the coupon-minter.

5. The system of claim 4, wherein to claim the coupon in the blockchain, the store-manager is configured to move the coupon from the wallet assigned to the coupon-minter to a wallet assigned to the store-manager.

6. The system of claim 5, wherein to observe the store-manager claim of the coupon, the clearing-house-manager is configured to monitor the wallet assigned to the store-manager.

7. The system of claim 1, wherein the system is configured to not publicly disclose the discount key or the discount information.

8. A method performed by data processing apparatus, the method comprising:
generating, by a coupon-minter, a coupon comprising encrypted discount information, wherein the encrypted discount information is encrypted with a discount key;
generating, by the coupon-minter, for the coupon, a hashlock from a preimage;
introducing, by the coupon-minter, the coupon to a blockchain in association with the hashlock, wherein the blockchain is configured to permit claiming of the generated coupon only upon receiving access to the preimage used to generate the hashlock;
detecting, by a clearing-house-manager, a store-manager's claiming of the coupon;
decrypting, by the clearing-house-manager, the encrypted discount key with a clearing-house private key to re-generate the discount key;
decrypting, by the clearing-house-manager, the encrypted discount information with the preimage;
claiming, by the store-manager, the coupon in the blockchain;
encrypting, by the store-manager, the discount key with a clearing-house public key;
updating, by the store-manager, the coupon with the encrypted discount key; and
transferring, by the store-manager, the coupon to a wallet associated with the clearing-house-manager;
wherein detecting the store-manager's claiming of the coupon comprises transferring, by the clearing-house-manager the transfer to a wallet associated with the clearing-house-manager, the coupon.

9. The method of claim 8, wherein the coupon-minter, the store-manager, and the clearing-house-manager are each further configured to authenticate records of claims submitted to the blockchain.

10. The method of claim 8, the method further comprises:
receiving, by the coupon-minter, an order to generate a plurality of coupons, each having the discount information; and
generating, by the coupon-minter, a plurality of coupons, including the coupon, each of the plurality of coupons having the discount information and each of the plurality of coupons having a different preimage.

11. The method of claim 8, wherein introducing the coupon to a blockchain in association with the hashlock further comprises introducing the coupon to the blockchain in a wallet assigned to the coupon-minter.

12. The method of claim 11, wherein claiming the coupon in the blockchain comprises moving the coupon from the wallet assigned to the coupon-minter to a wallet assigned to the store-manager.

13. The method of claim 12, wherein to observe the store-manager claim of the coupon, the clearing-house-manager is configured to monitor the wallet assigned to the store-manager.

14. The method of claim 8, wherein the blockchain is configured to not publicly disclose the discount key or the discount information.

15. A non-transitory computer storage media encoded with computer program instructions that, when executed by one or more processors, cause a computer device to perform operations comprising:
generating, by a coupon-minter, a coupon comprising encrypted discount information, wherein the encrypted discount information is encrypted with a discount key;
generating, by the coupon-minter, for the coupon, a hashlock from a preimage;
introducing, by the coupon-minter, the coupon to a blockchain in association with the hashlock, wherein the blockchain is configured to permit claiming of the generated coupon only upon receiving access to the preimage used to generate the hashlock;
detecting, by a clearing-house-manager, a store-manager's claiming of the coupon;
decrypting, by the clearing-house-manager, the encrypted discount key with a clearing-house private key to re-generate the discount key; and
decrypting, by the clearing-house-manager, the encrypted discount information with the preimage;
claiming, by the store-manager, the coupon in the blockchain;
encrypting, by the store-manager, the discount key with a clearing-house public key;
updating, by the store-manager, the coupon with the encrypted discount key; and
transferring, by the store-manager, the coupon to a wallet associated with the clearing-house-manager;
wherein detecting the store-manager's claiming of the coupon comprises transferring, by the clearing-house-manager, the transfer, to a wallet associated with the clearing-house-manager, the coupon.

16. The computer storage media of claim 15, wherein the coupon-minter, the store-manager, and the clearing-house-manager are each further configured to authenticate records of claims submitted to the blockchain.

17. The computer storage media of claim 15, further comprises:
   receiving, by the coupon-minter, an order to generate a plurality of coupons, each having the discount information; and
   generating, by the coupon-minter, a plurality of coupons, including the coupon, each of the plurality of coupons having the discount information and each of the plurality of coupons having a different preimage.

18. The computer storage media of claim 15, wherein introducing the coupon to a blockchain in association with the hashlock further comprises introducing the coupon to the blockchain in a wallet assigned to the coupon-minter.

19. The computer storage media of claim 18, wherein claiming the coupon in the blockchain comprises moving the coupon from the wallet assigned to the coupon-minter to a wallet assigned to the store-manager.

20. The computer storage media of claim 19, wherein to observe the store-manager claim of the coupon, the clearing-house-manager is configured to monitor the wallet assigned to the store-manager.

21. The computer storage media of claim 15, wherein the blockchain is configured to not publicly disclose the discount key or the discount information.

* * * * *